United States Patent

[11] 3,621,008

[72] Inventors John M. Ross
Wilmington, Del.;
Harvey I. Stryker, Carneys Point, N.J.
[21] Appl. No. 764,936
[22] Filed Oct. 3, 1968
[45] Patented Nov. 16, 1971
[73] Assignee E. I. du Pont de Nemours and Company
Wilmington, Del.

[54] DIRECT DISAZO AND TETRAAZO UREA DYES AND METHOD OF PREPARATION
8 Claims, No Drawings

[52] U.S. Cl.................................................. 260/175,
8/7, 8/41 R, 8/50, 8/54.2, 117/154, 260/167
[51] Int. Cl........................................................C09b43/14,
D21h 1/46
[50] Field of Search........................................... 260/167,
175

[56] References Cited
UNITED STATES PATENTS

| | | | |
|---|---|---|---|
| 935,017 | 9/1909 | Gunther et al................ | 260/175 |
| 1,538,934 | 5/1925 | Geller.......................... | 260/175 |
| 1,782,682 | 11/1930 | Geller.......................... | 260/175 |
| 2,157,876 | 5/1939 | Winkeler et al. ............. | 260/167 |
| 2,273,094 | 2/1942 | Fischer et al. ................ | 260/175 |
| 2,519,651 | 8/1950 | Hanhart ...................... | 260/167 |
| 2,633,462 | 3/1953 | Kehrer et al. ................. | 260/175 X |
| 2,666,757 | 1/1954 | Richter........................ | 260/175 |
| 2,777,840 | 1/1957 | Liechti et al.................. | 260/175 |
| 2,919,269 | 12/1959 | Nickel et al................... | 260/167 X |

OTHER REFERENCES

Colour Index, 2nd Ed., Vol. 3, p. 3246 (1956)

Primary Examiner—Floyd D. Higel
Attorney—Louis H. Rombach

ABSTRACT: Direct disazo and tetraazo urea dyes useful for dyeing cellulosic materials and consisting of salts of N,N'-bis-(sulfo- and carboxyarylazoaryl) ureas and salts of N,N'-bis(sulfo- and carboxyarylazoarylazoaryl) ureas, also known as bis(anilino)ketones, for example, bis[3-methyl-4-[(6,8-disulfo-2-naphthyl)azo]anilino] ketone, the cationic portions of said salts being at least 50 atom percent lithium and/or ammonium, and the remainder, sodium and/or potassium, a process for preparing said dyes, and stable aqueous solutions or suspensions of said dyes.

DIRECT DISAZO AND TETRAAZO UREA DYES AND METHOD OF PREPARATION

BACKGROUND OF THE INVENTION

1. Field of the Invention

This invention relates to direct disazo and tetraazo urea dyes for cellulosic materials, and more particularly, to salts of N,N'-bis(sulfo- and carboxyarylazoaryl) ureas and salts of N,N'-bis(sulfo- and carboxyarylazoarylazoaryl) ureas.

2. Description of the Prior Art

N,N' 28, and carboxyarylazoaryl) ureas and certain salts thereof are known as direct disazo dyes for cellulosic materials. A basic phosgenation process of manufacture of such dyes may be found in U.S. Pat. No. 935,018 which issued Sept. 28, 1909 to Günther and Hesse. Modifications and improvements in such dyes and their preparation are disclosed in U.S. Pat. No. 2,666,757 which issued Jan. 19, 1954 to Richter, and in German Pat. No. 1,068,406 which was granted Nov. 5, 1959.

The direct dyes of this type are widely used in the dyeing of paper or paper pulp and are generally sold in the form of powders. These dye powders are troublesome to manufacture and use in the mills for dyeing paper. Drying, grinding, dust-treatment, and standardization operations are required in the manufacture of the dye powders. In addition to dusting problems, it has been found in mill experience that the cold water beater dyeing strength of the dye powders on paper prepared from the dyed pulp is generally low. Moreover, the slow rate at which dye powders dissolve in cold water is a particular disadvantage, especially during winter months when the temperature of water used in paper beater dyeing operations may approach the freezing point. This lack of solubility, also, makes it difficult to use such dyes in continuous systems where pumping and metering of uniform dye solutions or suspensions is necessary for efficient operation.

The prior art method of preparing the aforesaid dyes involves the phosgenation of amino derivatives of arylazoaryl compounds, with the coupling byproduct hydrogen chloride being neutralized by a base such as sodium hydroxide or sodium carbonate. Using such bases, a precipitate begins to form shortly after phosgenation is commenced and the precipitate contains both product and reactant. Hence, the reaction yields are low and the product often must be purified by a lengthy procedure before it can be used for dyeing.

OBJECTS AND SUMMARY OF THE INVENTION

It is an object of the present invention to provide a novel group of direct disazo and tetraazo urea dyes which are salts of N,N'-bis(sulfo- and carboxyarylazoaryl) ureas and salts of N,N'-bis(sulfo- and carboxyarylazoarylazoaryl) ureas. Another object is to provide such dyes having water solubilities which are three to four times those of similar prior art compounds. It is a further object to provide direct dyes of the above type as stable aqueous solutions or suspensions. An additional object is to provide paper dyes having superior performance when used in the cold water beater dyeing system. A still further object is to provide a phosgenation process for the manufacture of dyes of the above type, said process being much faster than prior art phosgenation processes and such that the phosgenation reaction mass containing the dye can be standardized in the reaction vessel and then packaged for shipment and used directly in dyeing processes, thus eliminating isolation, purification and treatment of the dye itself.

The objects of the invention are achieved by means of a class of dyes having the formula

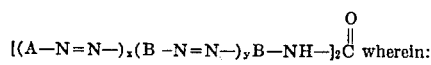

wherein:

A is a phenyl or phenylene group containing one to two substituents selected from $-CO_2M$ and $-SO_3M$ and not in excess of two substituents selected from $-OH$, $-OCH_3$ and $-CH_3$, or a naphthyl or naphthylene group containing one to two substituents selected from $-CO_2M$ and $-SO_3M$ and not in excess of three substituents selected from $-OH$, $-OCH_3$ and $-CH_3$, and M is a cation selected from $Li^+$, $Na^+$, $K^+$ and $NH_4^+$, with at least 50 atom percent selected from $Li^+$ and $NH_4^+$;

B is a phenylene group containing not in excess of two substituents selected from $-OH$, $-OCH_3$, and $-CH_3$; and x is 1 to 2, y is 0 to 1, and the sum of x and y is 1 to 2;

said dyes being produced by phosgenating an appropriate azo amine, produced by conventional means and containing not in excess of about 20 weight percent, based on dry weight, of a chloride or sulfate salt of sodium or potassium, said phosgenation being carried out in an aqueous medium while maintaining a pH of 4.0–7.0 with a base selected from ammonium hydroxide, lithium hydroxide, lithium bicarbonate and lithium carbonate.

DESCRIPTION OF THE INVENTION

The present invention resides in the discovery of a class of dyes which are salts of N,N'-bis(sulfo- and carboxyarylazoaryl) ureas and salts of N,N'-bis(sulfo- and carboxyarylazoarylazoaryl) ureas, said dyes having improved properties, especially greater purity as prepared and improved water solubility, over similar prior art dyes. The present invention also resides in the discovery of a phosgenation process for the preparation of the aforesaid dyes, the process being such that the reaction can be carried out quicker and at higher yields than similar prior art phosgenation processes. Finally, the present invention resides in the discovery that the liquid phosgenation reaction mixture resulting from operation of the process of this invention and containing the novel dyes of this invention can be used directly for dyeing cellulosics, thus eliminating the steps of isolation, purification and after-treatment required in the preparation and use of similar prior art dyes.

More particularly, one aspect of the present invention resides in the discovery of a novel class of salts of N,N'-bis(sulfo- and carboxyarylazoaryl) ureas and salts of N,N'-bis(sulfo- and carboxyarylazoarylazoaryl) ureas having the formula

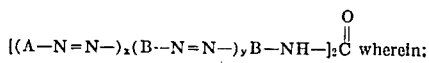

wherein:

A is a phenyl or phenylene group containing one to two substituents selected from $-CO_2M$ and $-SO_3M$ and not in excess of two substituents selected from $-OH$, $-OCH_3$ and $-CH_3$, or a naphthyl or naphthylene group containing one to two substituents selected from $-CO_2M$ and $-SO_3M$ and not in excess of three substituents selected from $-OH$, $-OCH_3$ and $-CH_3$, and M is a cation selected from $Li^+$, $Na^+$, $K^+$ and $NH_4^+$, with at least 50 atom percent selected from $Li^+$ and $NH_4^+$;

B is a phenylene group containing not in excess of two substituents selected from $-OH$, $-OCH_3$ and $-CH_3$; and x is 1 to 2, y is 0 to 1, and the sum of x and y is 1 to 2. The aforesaid dyes are prepared by phosgenating an appropriate azo amine. Azo amines can be prepared by well-known prior art methods, for example, by diazotizing an appropriate sulfo- and/or carboxyaryl amine, and then coupling the diazonium to a second appropriate aryl amine, that is, an aniline. Such azo amines, after phosgenation, often yield disazo ureas which are yellow. If it is desired to prepare a tetraazo dye of this invention (may yield other color shades), the initial diazonium can be coupled to a second sulfo- and/or carboxyaryl amine, and the resultant azo amine can be diazotized and coupled to the aniline. Alternatively, the sulfo- and/or carboxyaryl amine can be diazotized, coupled to the aniline, and the resultant azo amine can be diazotized and coupled to a second aniline. The aforesaid sulfo- and/or carboxyaryl amines usually are prepared by prior art methods as the sodium or potassium salts and may contain sodium or potassium chloride or sulfate. The only prerequisite for use of said amines in the present invention is that the amount of salt must not exceed about 20 weight percent, based on dry weight. Removal of excess salt may be effected by washing the amine with a dilute aqueous salt brine, for example, 3 weight percent aqueous sodium chloride. Preferably, the brine is acidified, for example, to a pH of about 3 with hydrochloric acid, to convert the amine at least partly to the free sulfo- and/or carboxy acid, thus further reducing the amount of sodium and/or potassium ions.

The phosgenation reaction of this invention is carried out by introducing phosgene into an aqueous solution of the aforesaid azo amine. A critical feature of the invention is that sufficient lithium and/or ammonium ions must be present during the phosgenation to maintain either a solution or a finely-divided fluid slurry. To ensure the presence of sufficient lithium and/or ammonium ions at the start of the phosgenation, the aqueous solution of azo amine may be rendered strongly alkaline, for example, to a pH of 10–11, using a base selected from ammonium hydroxide, lithium hydroxide, lithium bicarbonate and lithium carbonate prior to introduction of any phosgene. As soon as phosgene is added, for example, by bubbling it into the reaction vessel beneath the surface of the aqueous solution, the pH decreases due to liberation of hydrogen chloride. During the reaction, except for the momentary initial stage if the solution has been made alkaline as described above, the pH of the reaction mixture is maintained at 4.0–7.0 with one of the aforesaid bases. The preferred pH is 6.5–7.0. At a pH less than 4.0 the reaction rate is undesirably slow and it becomes more difficult to maintain a solution or fine suspension of reactants and product. At a pH above 7.0 the competing hydrolysis of phosgene is favored, thus resulting in excessive loss of this reactant. The preferred base is lithium hydroxide. Lithium carbonate is more difficult to add since its low water solubility precludes use of concentrated aqueous solution. Lithium bicarbonate is less basic and, therefore, is more costly to employ. Ammonium hydroxide provides the advantages of the process of this invention but somewhat deleteriously affects the strength of the dyes produced when used to dye cellulosics.

The reaction temperature should be such that either a solution or a very fluid finely divided slurry is maintained throughout the reaction. The temperature selected will depend, to a certain extent, on the volume of water present, and the latter will depend, to a certain extent, on the dye concentration desired in the reaction product since the present invention makes possible the direct use of the liquid reaction product. The preferred temperature is 70°–75° C. since at this temperature an excellent combination of reaction rate and solubility can be achieved. Moreover, at this temperature the reaction can be carried out at atmospheric pressure, thus simplifying equipment requirements.

Theoretically, two moles of appropriate azo amine are required for each mole of phosgene. Since hydrolysis of phosgene is unavoidable, an excess of the stoichiometric amount of this reactant must be employed, although it has been discovered that the loss of phosgene through hydrolysis is much less in the instant process than in prior art phosgenation processes. Correspondingly, the amount of salt byproduct is less in the present invention. Moreover, the reaction rate of the principal reaction in the present invention is appreciably higher than in prior art phosgenations. Twofold increases in reaction rate (three times as fast) have been observed. Since it is difficult to predict the amount of phosgene which will be lost via hydrolysis, it is preferred to determine the completion of the reaction by removing, from time to time, a sample of the reaction mixture and then analyzing said sample for free amine. This may be done, for example, by submitting the sample to a diazotization procedure, and thereafter attempting to couple the diazotization mixture to a dye-producing compound, for example, Chicago Acid. With this coupler a blue color will be produced if the original sample still contained free azo amine.

When the phosgenation reaction is completed, the reaction mixture is cooled and the pH is adjusted, usually to 7.0–8.0. The liquid reaction product then may be sampled for standardization, diluted with water or concentrated, if necessary, to achieve the desired dye strength, and packaged for direct sale and use. The process of the present invention does not preclude isolation of the dye product and the use of the resultant dye powder in a manner analogous to similar prior art dyes. All of the advantages of the present invention relative to improved preparation, higher solubility of the dyes, and the like, accrue to dye powders prepared by means of this invention. However, since the present process provides a liquid product usually having about 50 percent of the dye strength of prior art dry powders, economics often favors the use of the liquid products directly. By the process of the present invention stable aqueous solutions or suspensions containing about 10 to about 40 weight percent active dye ingredient can be prepared. Moreover, the process of the present invention permits the introduction of additives, for example, dispersing agents, directly to the phosgenation reaction mixture. A particularly useful aqueous dye product prepared by the process described above contains, on a weight basis, 10–25% dye (as the free acid)
0.75–1.5% $Li^+$
2–5% $Cl^{7E}$ and/or $SO_4^=$
up to 3% $Na^+$ and/or $K^+$
up to 8% dispersing agent
balance (about 57–87%), to make 100%, water.

As indicated above, the phosgenation is carried out with an azo amine prepared from an appropriate sulfo- and/or carboxyaryl amine and an appropriate aniline by well-known diazotization and coupling techniques.

Also as indicated above, the phosgenation is carried out in the presence of lithium and/or ammonium ions. The dye products are salts wherein the cation is comprised of at least 50 atom percent lithium and/or ammonium ions, the balance if necessary, being sodium and/or potassium ions.

The process of this invention requires that one of the amines from which the azo amine is derived must contain one or two carboxy and/or sulfo groups, or salts thereof. If the amine is a naphthyl amine, it is preferred that two such acid groups be present, and preferably, two sulfo groups. It is obvious from the above that the present invention contemplates the use of sodium and/or potassium salts of sulfo- and carboxyaryl amines as starting materials for the preparation of the azo amines which are subsequently used in the phosgenation process of this invention. Other substituents selected from –OH, –OCH$_3$ and –CH$_3$ may be attached to the aromatic ring along with the one or two carboxy and/or sulfo groups, or salts thereof. If the amine in question is a naphthyl amine, up to three of such other substituents may be present. If the amine in question is a phenyl amine, up to two of such other substituents may be present.

The second amine or coupler from which the aforesaid azo amine is derived is a phenyl amine. The simplest such amine is aniline. Other substituents may be attached to the aromatic ring in addition to the amino group. Up to two such additional substituents selected from –OH, –OCH$_3$ and –CH$_3$ may be present.

The preferred dyes of this invention are those represented by the examples which are presented hereinbelow. Especially preferred are the dyes derived from 2-aminonaphthalene-6,8-disulfonic acid and meta-toluidine, from 2-aminonaphthalene-4,8-disulfonic acid and meta-toluidine, and from 2-aminonaphthalene-4,8-disulfonic acid and cresidine (2-amino-4-methylanisole). For the especially preferred dyes, A in the general formula previously shown is either

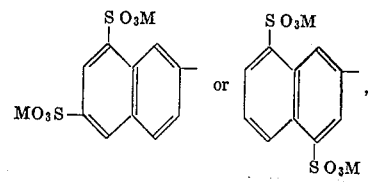

while B is either

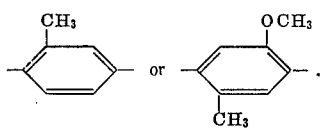

The dyes of the present invention may be used directly in the form of a solution or suspension as prepared, or as dry powders, to dye cellulosic materials, especially paper, in the usual paper mill equipment. The following description represents a typical dyeing operation. Normally 0.1 to 3.0 parts of the dye liquid are added to an aqueous slurry of 100 parts (dry basis) of bleached sulfite pulp in 5,000 parts of water at ambient temperature (2°–38° C.); 0.5 to 3 parts of rosin size (sodium rosinate) and 1 to 4 parts of aluminum sulfate octadecahydrate are then added. The mixture is thoroughly agitated for 10 to 20 minutes and water is added as needed to give a total of 20,000 to 25,000 parts. Paper sheet is then made up in the usual manner. The dye liquids of the invention can also be used for continuous coloring of paper by constant metering of the dye liquid into the pulp slurry. A number of advantages accrue from this procedure, notably rapid and efficient shade control and quicker changeover from one shade to another because only a small part of the system is normally contaminated with color or colored pulp. The problems of dust, and the dissolving of the powdered dye are eliminated.

It already has been noted that the temperature of water used in papermaking may be close to freezing. The liquid dyes of the invention show advantages over prior art dyes under these cold water conditions in the speed of dissolving and completeness of utilization. This is probably due to the increased solubility of the lithium dye salts, and/or the finely divided form of the dye particles in suspension. Although not always true solutions the product dye liquids can nevertheless be pumped and metered as liquids of constant composition. The unusual properties of the products in conjunction with the unusual process of the invention have made it possible to produce stable aqueous dye liquids of substituted urea dyes in relatively high concentrations.

The invention is illustrated in the following examples, which are not intended to be restrictive. All amounts, unless otherwise indicated, are on a weight basis. Lithium hydroxide was employed as the monohydrate.

EXAMPLE 1

Amino G-acid (2-aminonaphthalene-6,8-disulfonic acid) monopotassium salt was diazotized, using hydrochloric acid and sodium nitrite. Coupling was accomplished by adding meta-toluidine to the diazo mixture at about 25° C. After overnight stirring the temperature was raised to 35° C. and held for 1 hour; then the charge was filtered and the free liquid was blown or sucked out. The material in the filter was washed with 3 percent sodium chloride brine whose pH had been adjusted to 3.0 ± 0.2 with hydrochloric acid. Residual liquid was again blown or sucked away from the cake. This procedure reduced the salt content of the filter cake in preparation for the phosgenation step.

To a suitable reactor were added 10 parts of water and 9 parts of 20 percent lithium hydroxide solution. About 20 parts of the 2-(4'-amino-2'-tolylazo)naphthalene-6,8-disulfonic mono-acid salt from the previous reaction were then added in the form of filter cake (about 50 percent water). The charge was heated to 70°–75° C. and the pH was adjusted to 10.0 to 11.0 by adding 20 percent lithium hydroxide solution. The charge was an oily, amber colored solution at this stage. The volume was adjusted to about 65 parts by adding water; about 0.5 part of a filter aid (diatomaceous earth) was added and the charge was clarified by filtration to remove extraneous solids. Phosgene was then added through a leg beneath the surface, the temperature being maintained at 70°–75° C. As the phosgene reacted, the pH fell and was maintained at 6.5 to 7.0 by adding 20 percent lithium hydroxide solution as needed. After about 3 parts of phosgene had been added, the charge was tested for completion of reaction by removing a sample and diazotizing it and coupling to Chicago Acid (a blue color indicates presence of unreacted base). The test was repeated thereafter with each additional 0.5 part of phosgene until reaction was complete. About 4.0 parts of phosgene were required. When reaction was complete, 20 percent lithium hydroxide solution was added to raise the pH to 7.5 ± 0.5, and about 0.75 part of dispersing agent (sodium salt of naphthalene-formaldehyde condensate—"Blancol"), was added and stirred in for about one-half hour. The charge was then cooled to about 25° C. and sampled for standardization. It was diluted with water to give the desired color strength and finally drummed through an 80 mesh screen (U.S. Bureau of Standards, Standard Screen Series, 1919) into shipping containers. Active ingredient content was about 20 percent and the product contained about 1.0 percent lithium as $Li^+$ ion and combined lithium (attached to dye).

The slurry dyed paper and cotton to a reddish-yellow color using conventional dyeing techniques. It was stable and did not show appreciable settling over a period of several months, although a small amount of clear liquid was observed at the top of a sample after that period of time.

EXAMPLE 2

Wet presscake equivalent to 151.5 parts of Amino G-acid was diazotized using hydrochloric acid and sodium nitrite and the diazo slurry was treated with a solution of 93 parts of cresidine hydrochloride dissolved in 350 parts of water. The pH of the coupling mass was raised to 2.5 by the addition of 30 percent sodium formate and the temperature was maintained at 35° to 40° C. for 4 hours to complete the reaction. The charge was filtered and the cake was washed with 1,000 parts of 1 percent aqueous hydrochloric acid.

The wet cake of the aminoazo base was warmed with 148 parts of 20 percent lithium hydroxide solution and adjusted so as to give a clear solution equivalent to 210 parts of pure base in a volume of 850 parts. The solution was warmed to 75° C. and phosgenated as described in Example 1 using 20% lithium hydroxide solution as the acid acceptor so as to hold the pH at 6.5 to 7.0. When the phosgenation reaction was complete, the pH was adjusted to 8.5 with lithium hydroxide and the hot solution was cooled with agitation in the presence of 17.4 parts of "Blancol." The thick, cold reaction liquid was diluted with water to an active ingredient of 14.4 percent which gave bright orange tissue dyeings by conventional dyeing procedures.

EXAMPLE 3

Wet presscake of the monopotassium salt of Amino G-acid equivalent to 151.5 parts of the pure disulfonic acid was dissolved in 280 parts of ice and water with the addition of 50 parts of 30 percent caustic soda. The solution was treated with 125 parts of 34.5 percent solution of sodium nitrite and run into an agitated mixture of 380 parts of ice and water containing 36 parts of concentrated hydrochloric acid. The resultant slurry was agitated for 1 hour at 25°±2° C. The reaction mass was filtered and the wet diazo cake (240 parts) was suspended in 250 parts of water.

A solution of 93 parts of cresidine hydrochloride in 350 parts of water was added to the diazo slurry, the coupling mass was warmed to 35° C., and the pH was raised to 3.5 by the addition of the necessary amount of a 20 percent solution of lithium hydroxide. When the reaction was complete, as indicated by the total disappearance of the diazo compound, the pH of the mass was raised further to 7.0 with 20 percent lithium hydroxide giving approximately 920 parts of a clear, deep red solution of the salt of 2-(4'-amino-5'-methoxy-2'-tolylazo)naphthalene-6,8-disulfonic acid.

The entire coupling solution was warmed to 75° C. and phosgenated as described in the previous examples using 20 percent lithium hydroxide solution as the acid acceptor to hold the pH in the range of 6.5 to 7.0. The phosgenation was continued until the aminoazo base was shown to be completely reacted, giving a clear solution of the substituted urea dye. The hot solution was cooled with agitation and treated with dispersant ("Blancol") and water as diluent to give a stable liquid color having an active ingredient of 14.6 percent, at which strength it was used to dye tissue an attractive orange shade.

EXAMPLE 4

About 200 parts of 1-(4'-amino-3'-methoxyphenylazo)-benzene-3-sulfonic acid filter cake (prepared from sodium metanilate and ortho-anisidine omega sulfonic acid by prior art procedure) were slurried in 300 parts of water and warmed to 70°-75° C. The resultant slurry was treated with 100 parts of 20 percent lithium hydroxide monohydrate solution to form a clear solution having a pH of 8.1 at 75° C. The hot solution was diluted to 850 parts by volume. Titration of an aliquot sample with standard titanium trichloride solution indicated that 66.5 parts of actual organic base was present. The solution was transferred to a glass flask equipped with an efficient agitator and gas distributor. The apparatus was set up in a ventilated hood and also equipped with an exhaust gas scrubber system adequate for removal of toxic exhaust gases. A stream of phosgene was fed under the surface of the hot agitated solution, the temperature being maintained at 70°-75° C. The pH was allowed to fall to 6.5 to 7.0 and was thereafter maintained in that range by the continuous addition of lithium hydroxide solution made up in the proportion of 20 parts lithium hydroxide monohydrate to 100 parts of water. Course of the phosgenation reaction was followed by periodic removal of small aliquot samples which were analyzed to determine the disappearance of the amine-containing base. When the reaction was complete, as indicated by complete disappearance of base, 35 parts of phosgene had been fed to the reactor. The solution was still clear. The mass was treated with 10 parts of dispersing agent ("Blancol") and transferred to a larger flask for standardization. It was there cooled to 20° C. during which time part of the phosgenated product precipitated, resulting in a thin mobile slurry totaling 1,190 parts. The mass was standardized to the desired strength by dye test comparison and subsequent addition of the required amount of water. The liquid was used to dye paper and cotton a greenish-yellow color.

EXAMPLE 5

The phosgenation procedure of example 4 was repeated using a mixture of 63.8 parts of 1-(4'-amino-3'-methoxyphenylazo)benzene-3-sulfonic acid and 11.3 parts of 1-(4'-amino-3'-methoxy-6'-tolylazo)benzene-3-sulfonic acid. Both intermediates were prepared by prior art procedure. A solution of these compounds as their lithium salts at a total volume of 1,000 parts was used. A clear solution was maintained throughout the phosgenation performed at 70°-75° C. while the pH was maintained at 6.5 to 7.0 by addition of 20 percent lithium hydroxide solution. At the completion of the phosgenation reaction the entire mass was converted to powder by spray drying and the crude mass was standardized to suitable strength. The dye produced in this way showed excellent solubility and dyed paper by tissue or regular beater methods a greenish-yellow, although noticeably redder than paper dyed by the product obtained in example 4.

EXAMPLE 6

The phosgenation procedure of example 4 was repeated using a mixture of 49.8 parts of 1-(4'-amino-3'-methoxyphenylazo)benzene-3-sulfonic acid, 37.2 parts of 5-(4'-aminophenylazo)-2-hydroxybenzoic acid, and 11.4 parts of 5-(4'-aminophenylazo)-2-hydroxy-3-methylbenzoic acid as the lithium salts, adjusted with water to a total volume of 850 parts. All intermediates were prepared by prior art procedures. A clear solution was maintained throughout the phosgenation. On completion of the phosgenation the mass was heated to 100°±2 C. and salted with common salt until the baume of a filtered sample was 22°. The salted mass was cooled with agitation, filtered when cold, and dried and standardized. The resultant powder was used to dye paper and cotton a greenish-yellow with a high degree of lightfastness.

EXAMPLES 7-15

Using the procedures described in the above examples, additional dyes were prepared from the intermediates shown in the table provided below. The dyes were recovered either as dry powders or as solutions and/or suspensions and were employed in standard dyeing precedures to dye paper. Examples 13-15 demonstrate the formation of tetraazo ureas using double coupling reactions as described above. Amino J-acid is 2-aminonaphthalene-5,7-disulfonic acid; C-acid is 2-aminonaphthalene-4,8-disulfonic acid; and 1,6-Cleves acid is 1-aminonaphthalene-6-sulfonic acid. GY is greenish-yellow; RY is reddish-yellow; YO is yellow-orange; YB is yellow-brown; and RB is reddish-brown.

| Example No. | Acid | Aniline | Shade of Tissue Dyeing |
| --- | --- | --- | --- |
| 7 | Amino G-acid | aniline | GY |
| 8 | Amino G-acid | o-anisidine | RY |
| 9 | C-acid | o-anisidine | RY |
| 10 | Amino J-acid | m-toluidine | RY |
| 11 | C-acid | m-toluidine | RY |
| 12 | C-acid | cresidine | YO |
| 13 | Amino G-acid | 1. cresidine 2. m-toluidine | YB |
| 14 | Amino G-acid | 1. m-toluidine 2. cresidine | YB |
| 15 | 1. Amino G-acid 2. 1,6-Cleves acid | aniline | RB |

The embodiments of the invention in which an exclusive property or privilege is claimed are defined as follows:

1. Direct disazo or tetraazo urea dye having the formula $$[(A-N=N-)_x(B-N=N-)_yB-NH-]_2\overset{O}{\underset{\|}{C}}$$ wherein:

A is phenyl or phenylene substituted by 1 to 2 $-CO_2M$ or $-SO_3M$ substituents and by 0 to 2 $-OH$, $-OCH_3$ or $-CH_3$ substituents, or naphthyl or naphthylene substituted by 1 to 2 $-CO_2M$ or $-SO_3M$ substituents and by 0 to 3 $-OH$, $-OCH_3$ or $-CH_3$ substituents and M is selected from $Li^+$, $Na^+$, $K^+$ and $NH_4^+$, with at least 50 atom percent being selected from $Li^+$ and $NH_4^+$;

B is phenylene substituted with 0 to 2 $-OH$, $-OCH_3$ or $-CH_3$ substituents; and $x$ is 1 to 2, $y$ is 0 to 1, and the sum of $x$ and $y$ is 1 to 2.

2. The dye of claim 1 wherein A is

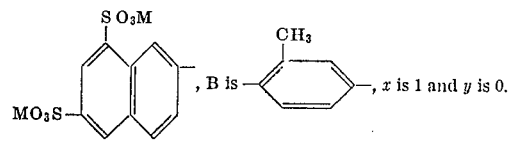, $x$ is 1 and $y$ is 0.

3. The dye of claim 1 wherein A is

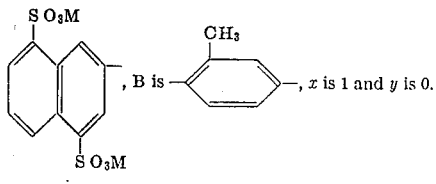, $x$ is 1 and $y$ is 0.

4. The dye of claim 1 wherein A is

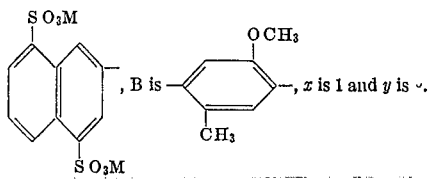, B is —, $x$ is 1 and $y$ is ⌄.

5. The improved process of forming a stable, pumpable, concentrated aqueous solution or suspension of a direct disazo or tetraazo dye which has been prepared by phosgenating in an aqueous medium at a pH of 4.0–7.0 the alkali metal salt of a sulfo- or carboxy- arylazoaryl or arylazoarylazoaryl amine wherein terminal aryl is phenyl or naphthyl and internal aryl is phenylene or naphthylene, the improvement which consists of forming the solution or suspension of dye while simultaneously carrying out the phosgenation reaction by controlling the pH of the reaction medium with lithium hydroxide, lithium bicarbonate, lithium carbonate or ammonium hydroxide.

6. The process of claim 5 wherein the solution or suspension is formed and the phosgenation is carried out at atmospheric pressure at a temperature of 70°–75° C. with the alkali metal salt of 2-(4'-amino-2'-tolylazo)naphthalene-6,8-disulfonic acid while the pH is maintained at 6.5–7.0 with lithium hydroxide.

7. The process of claim 5 wherein the solution or suspension is formed and the phosgenation is carried out at atmospheric pressure at a temperature of 70°–75° C. with the alkali metal salt of 2-(4'-amino-2'-tolylazo)naphthalene-4,8-disulfonic acid while the pH is maintained at 6.5–7.0 with lithium hydroxide.

8. The process of claim 5 wherein the solution or suspension is formed and the phosgenation is carried out at atmospheric pressure at a temperature of 70°–75° C. with the alkali metal salt of 2-(4'-amino-3'-methoxy-6'-tolylazo)-naphthalene-4,8-disulfonic acid while the pH is maintained at 6.5–7.0 with lithium hydroxide.

* * * * *